United States Patent [19]

Minami

[11] Patent Number: 4,483,148

[45] Date of Patent: Nov. 20, 1984

[54] VEHICLE SPEED CONTROL DEVICE FOR USE IN TROLLEY-ASSISTED DUMP TRUCKS OF SINGLE PHASE ALTERNATING CURRENT SYSTEM

[75] Inventor: Teruo Minami, Kawasaki, Japan

[73] Assignee: Kabushiki Kaisha Komatsu Seisakusho, Tokyo, Japan

[21] Appl. No.: 498,285

[22] Filed: May 26, 1983

[30] Foreign Application Priority Data

May 27, 1982 [JP] Japan .................. 57-076952

[51] Int. Cl.³ ............................................. F01B 21/04
[52] U.S. Cl. ...................................... 60/698; 180/65.2
[58] Field of Search .................. 60/698, 716, 719; 180/65.2, 65.3, 302

[56] References Cited

U.S. PATENT DOCUMENTS 3,704,760 12/1972 Maruyama ...................... 180/302 X
4,400,997 8/1983 Fiala ............................... 180/65.2 X Primary Examiner—Stephen F. Husar
Attorney, Agent, or Firm—Armstrong, Nikaido, Marmelstein & Kubovcik

[57] ABSTRACT

A vehicle speed control device for use in a trolley-assisted dump truck of a single phase alternating current system can control the driving torque in proportion to the amount of depression of an accelerator pedal in the same manner as in the case of running under an engine mode condition even when running under a trolley mode condition utilizing a commercial power source. The device comprises in combination an accelerator valve for controlling compressed air from a reservoir in proportion to the amount of depression of an accelerator pedal, an engine throttle control unit controlled by the compressed air passed through the accelerator valve, an acceleration pattern generator actuated by the compressed air to convert the air pressure into a voltage, a mode converted for sending out a voltage pattern to a main drive circuit of the truck in response to a voltage signal from the acceleration pattern generator, and an engine control solenoid operated valve for selectively controlling supply of the compressed air to the engine throttle control unit and to the acceleration pattern generator.

1 Claim, 5 Drawing Figures

ALTERNATING CURRENT → DIRECT CURRENT

VEHICLE SPEED CONTROL DEVICE FOR USE IN TROLLEY-ASSISTED DUMP TRUCKS OF SINGLE PHASE ALTERNATING CURRENT SYSTEM

BACKGROUND OF THE INVENTION

1. Field of the Invention

This invention relates to a vehicle speed control device for use in a trolley-assisted dump truck of a single phase alternating current system, and more particularly to the vehicle speed control device which can vary an output of an electric motor for driving the dump truck by varying a voltage applied to the motor in proportion to the degree of depression of an acceleration pedal.

2. Description of the Prior Art

In view of the availability of petroleum becoming tight increasingly in the recent years, there is a relevant tendency towards energy saving even in large mines. In particular, in the districts where sufficient power can be generated by hydraulic power and by thermal power obtained by burning coals, but are lacking in petroleum resources, there can be seen a strong demand for replacing petroleum driven mining machines by electrically driven mining machines in order to save petroleum products.

Besides the tendency of petroleum saving, there can be seen a tendency of falling productivity due to the suspension of movements of vehicles so as to prevent a pit of the mine from oxygen deficient condition arising from the exhaust gas smog emitted from the engines of ore carrying vehicles and the amount of which increases as the pit becomes deeper.

In order to eliminate such troubles in the late years, there has been proposed a double-wire trolley assisted dump truck system utilizing a cheap commercial power supply on the ascent courses extending from the bottom of the pits to the dumping areas.

The trolley-assisted dump trucks can be driven either in a trolley mode utilizing a commercial power source or in an engine mode utilizing generators driven by internal combustion engines mounted on themselves, respectively.

A commercial power source is utilized to run dump trucks in the trolley mode and the voltage applied across double trolley wires is maintained constant, and therefore the output of the drive motor can be kept constant. For this reason, it has so far been impossible for the operator to control the torque for driving dump trucks as desired.

SUMMARY OF THE INVENTION

The present invention has been contemplated in view of the above-mentioned circumstances, and has for its aspect to provide a vehicle speed control device for use in trolly-assisted dump trucks of single phase alternating current system which enables controls of the driving torque to be achieved in proportion to the amount of depression of the accelerator pedal in the same manner as in the case of the dump truck running in the engine mode even when it runs in the trolley mode.

To achieve the above-mentioned aspect, in accordance with the present invention, there is provided a vehicle speed control device for use in a trolley-assisted dump truck of a single phase alternating current system, characterized in that it comprises in combination an accelerator valve adapted to variably control the pressure of compressed air from an air reservoir in proportion to the amount of depression of an accelerator pedal by the operator; an engine throttle control means adapted to receive the air pressure controlled by the accelerator valve to thereby control the engine throttle means; an acceleration pattern generator adapted to receive the air pressure controlled by said accelerator valve and convert the air pressure into a voltage; a mode convertor adapted to receive a voltage signal from the acceleration pattern generator and send out or transmit a voltage pattern to a mixed bridge rectifier installed in a main drive circuit and which comprises thyristors and diodes; and an engine control solenoid operated valve adapted to be actuated when a trolley mode change-over switch is turned on and occupy a trolley mode position wherein the compressed air controlled by said accelerator valve is directed or supplied into said acceleration pattern generator, said engine control valve being further adapted to be actuated by the resilient force of a spring associated therewith when the trolley mode change-over switch is turned off and occupy an engine mode position wherein the compressed air is directed or supplied into said engine throttle control means.

BRIEF DESCRIPTION OF THE DRAWINGS

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

DETAILED DESCRIPTION OF THE INVENTION

Figure 1:
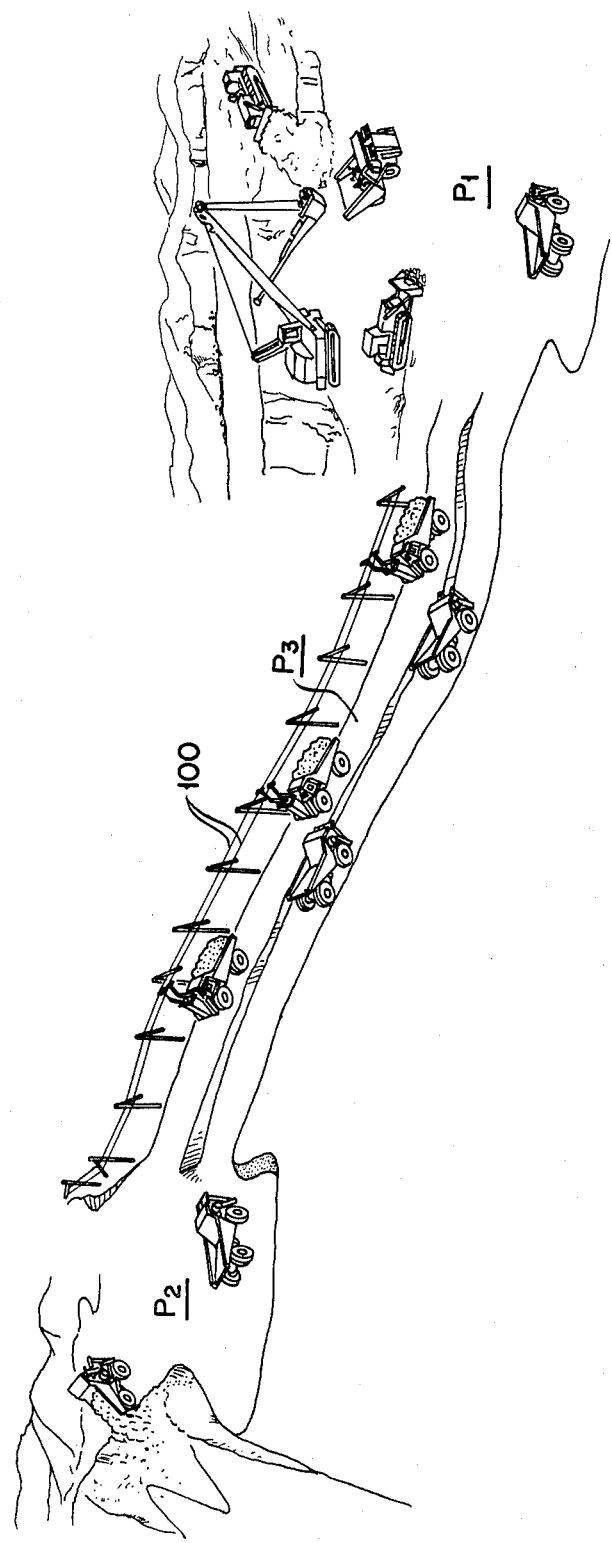
FIG. 1 is an explanatory view of the operating condition when trolly-assisted dump trucks of a single phase alternating current system are operated.

In FIG. 1, there is depicted a dump truck practical application system of double trolley assisted type laid from a pit $P_1$ or a loading area of a mine through a slope or ascent course $P_3$ to a dumping area $P_3$. As can be seen from FIG. 1, the trolley-assisted system is utilized only on the ascent course, and when dump trucks run on flat roads and descent courses with low fuel consumption, they utilize the power generated by the engines mounted on them.

Figure 2:
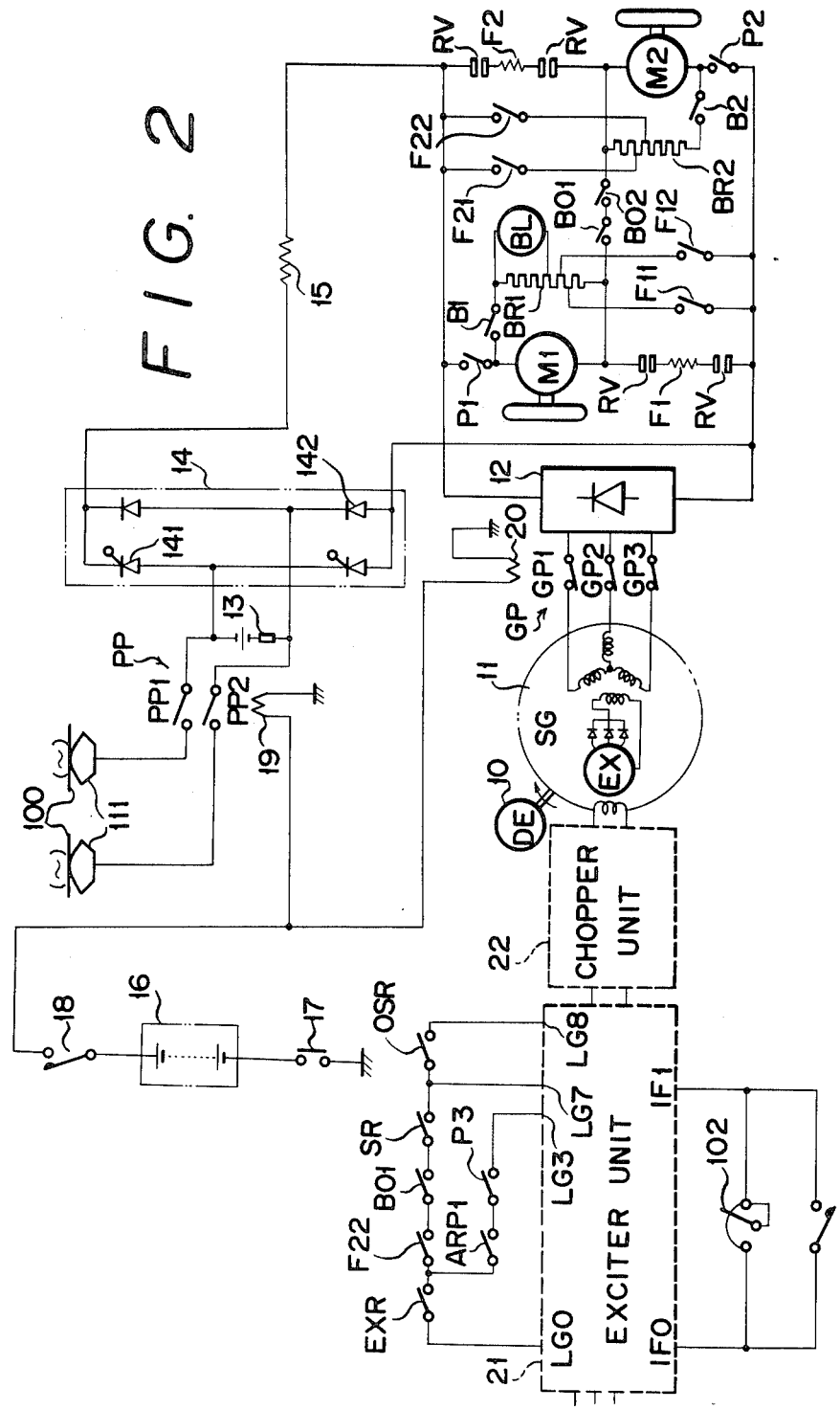
FIG. 2 is an explanatory view of the configuration of a main circuit for driving trolley-assisted dump trucks.

In FIG. 2, there is shown a main circuit for running or driving trolley-assisted dumps of a single phase alternating current system. This main circuit comprises in combination a circuit for running the dump truck in an engine mode including drive motors $M_1$ and $M_2$ directly connected to drive wheels through a rectifier 12 electrically connected with an a.c. generator 11 directly connected to an engine 10 of the dump truck, and another circuit for running the dump truck in a trolley mode including a mixed bridge rectifier 14 comprised of thyristors 141 and diodes 142 which are connected through pantagraphs 111 with a commercial power supply.

The vehicle drive system in the engine mode is arranged such that if and when the accelerator pedal is depressed, the number of revolution of the engine will increase thus completing a vehicle drive circuit at the same time. As a result, contacts EXR, ARP$_1$ and P$_3$ between the terminals LG0 and LG3 as shown in FIG. 2 are closed to render operative an excitor control unit and a chopper circuit thus allowing a required electric current to flow through the exciting windings of the exciter of the a.c. generator 11 thereby controlling the output of the latter. In consequence, the dump truck is driven and the drive force of the truck varies in proportion to the amount of depression of the accelerator pedal.

Whilst, when applying braking forces on the wheels, controls of the generator 11 under a dynamic braking condition wherein the drive motors M$_1$ and M$_2$ are rotated by the driving forces transmitted from tires so as to act as generators are made such that when a brake pedal 102 is depressed, contacts EXR, F$_{22}$, BO$_1$ and SR between terminals LGO and LG7 are closed to form a dynamic braking circuit, and the exciter unit 21 and the chopper circuit 22 are rendered operative thereby allowing a required electric current to flow through the exciting windings of the exciter and controlling the output of the a.c. generator 11. Consequently, the vehicle is subjected to braking effect or force which is controlled in proportion to the amount of depression of the brake pedal 102.

This main drive circuit further comprises field windings F$_1$, F$_2$ of the motors M$_1$, M$_2$, brake resistors BR$_1$, BR$_2$, a blower motor BL, an exciter EX, solenoid contactors P$_1$ and P$_2$ for propulsion, solenoid contactors BO$_1$, BO$_2$, B$_1$ and B$_2$ for braking, and field weakening contactors F$_{11}$, F$_{12}$, F$_{21}$ and F$_{22}$.

The trolley assisting device comprises pantagraphs 111 serving as current collectors, breakers PP$_1$ and PP$_2$ for trolley mode, breakers GP$_1$, GP$_2$ and GP$_3$ for engine mode, and A.C. filter 13, a mixed bridge rectifier 14 consisting of thyristors 141 and diodes 142, a reactor 15 for smoothing the signal phase alternating pulsating current, a battery 16 mounted on the dump truck, a battery switch 17, and a trolley mode change-over switch 18. The arrangement is made such that the propulsion solenoid contactors P$_1$, P$_2$ are excited and closed by a pressure switch for accelerator not shown and the braking solenoid contactors BO$_1$, BO$_2$, B$_1$ and B$_2$ are excited and closed by a pressure switch for brake not shown, and further, both contactor groups such as, for example, a contactor group P$_1$, P$_2$ and another contact group BO$_1$, BO$_2$, B$_1$, B$_2$ are electrically or mechanically interlocked so that both groups are not allowed to become operative at the same time.

The arrangement is further made such that both the trolley assisting breakers PP$_1$ and PP$_2$ and the engine mode breakers GP$_1$, GP$_2$ and GP$_3$ are energized by the trolley mode change-over switch 18, and the former and latter breakers are electrically or mechanically interlocked so that they may not be energized at the same time.

Figure 3:
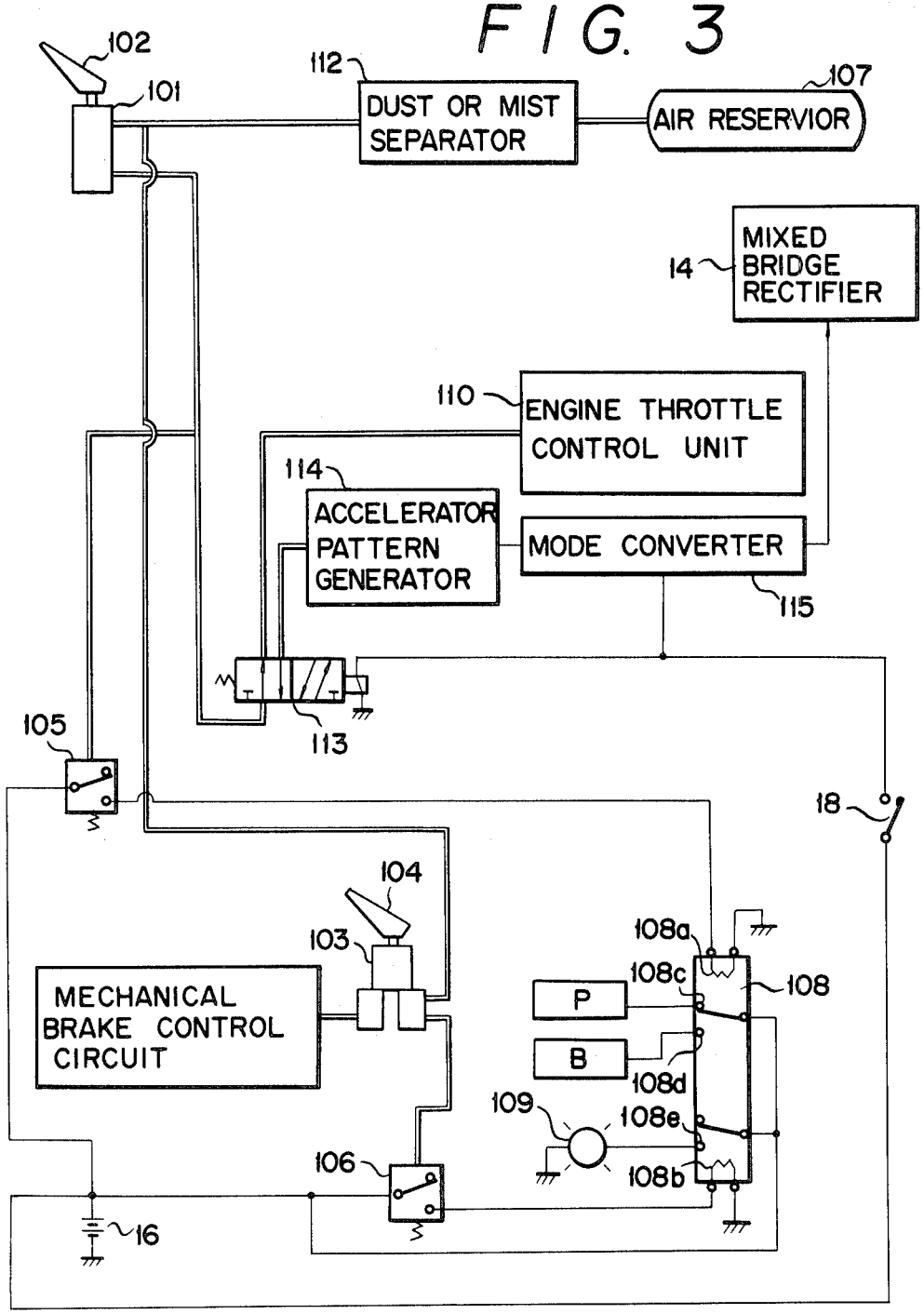
FIG. 3 is an explanatory view of schematic configuration of one embodiment of a vehicle speed control device for use in trolley assisted dump trucks of a single phase alternating current system.

FIG. 3 is an explanatory view of the schematic configuration of one embodiment of the vehicle speed control device according to the present invention. In this drawing, reference numeral 101 denotes an accelerator adapted to be controlled by an accelerator pedal 102, and 103 a brake valve adapted to be controlled by a brake pedal 104. Reference numerals 105 and 106 denote pressure switches adapted to be turned on by the air pressure supplied from an air reservoir 107 when the above-mentioned valves 101 and 103 are actuated. Reference numeral 108 indicates a self-holding relay circuit for accelerator (for propulsion) and for brake (for braking). In this circuit, reference numeral 108a denotes a coil for resetting the above-mentioned relay 108 by an acceleration signal generated when the acceleration valve is operated, 108b a coil for resetting the relay 108 by an acceleration signal generated when the brake valve is operated, 108c a contact for accelerator connected with the solenoid contactor P for propulsion, and 108d a contact for brake connected with the breaking solenoid contactor B. Reference numeral 108e denotes an interlocking contact for illuminating a dynamic brake indication lamp when the vehicle is subjected to braking, 110 an engine throttle control means, 112 a mist separator, and 113 an engine control solenoid operated valve adapted to supply compressed air into the engine throttle control means when the vehicle runs in the engine mode and to supply compressed air into the acceleration pattern generator 114 when the vehicle runs in the trolley mode. Reference numeral 115 indicates a mode convertor.

Figure 4:
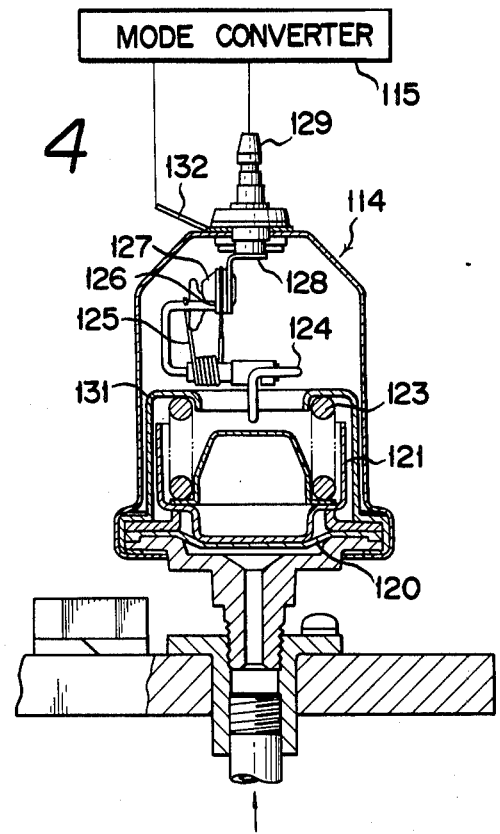
FIG. 4 is a longitudinal sectional view showing the detailed construction of an accelerator pattern generator employed in the vehicle speed control device according to the present invention.

FIG. 4 shows the construction of an accelerator pattern generator 114.

The acceleration pattern generator 114 contains therein a diaphragm 120, a spring 123 for setting the displacement of the diaphragm 120, a spring retainer 131 for the spring 123, and a cup 121 adapted to transmit the displacement of the diaphragm 120 to a crank 124. The crank 124 has a contact 126 connected to the leading end thereof and which is kept in sliding contact with a rheostat 127 so as to vary the value of resistance of the latter. Reference numeral 125 indicates a return spring for the crank 124.

The rheostat 127 is coupled with a terminal 129 by means of a wire 128. Whilst, the contact 126 is electrically connected through the casing with a terminal 132.

Figure 5:
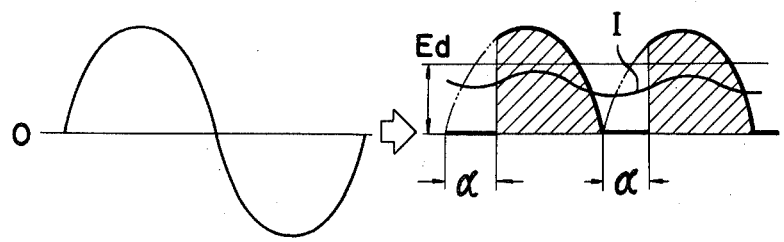
FIG. 5 is an explanatory view of the control pattern of the voltage in the trolley mode of the vehicle speed control device of the present invention.

Thus, when the vehicle runs in the trolley mode, the engine control valve 113 is changed over to the trolley mode position so that if the operator depresses the accelerator pedal 102 then the compressed air pressure may be supplied through the engine control valve 113 into the acceleration pattern generator 114. Where the air pressure is converted into a voltage, and a voltage pattern varying in proportion to the amount of depression of the accelerator pedal will be sent out. As a result, the gates of the thyristors 141 of the mixed bridge rectifier 14 are controlled so that the three phase alternating current (shown to the right of FIG. 5) which is the commercial power supply from the trolleys may be rectified and converted into a single phase direct current (shown to the right of the drawing), and also the phase angle $\alpha$ of the resultant direct current is controlled.

Thus, a mean voltage Ed of the direct current and a mean electric current I thereof may be varied in proportion to the angle of the accelerator pedal depressed by the operator and supplied to the drive motors. Therefore, the driving force can be varied in the same manner as that in the control of the pattern of the a.c. generator 11 at the time of the above-mentioned engine mode, and therefore it is very convenient for the operation of the dump trucks.

It is to be understood that the foregoing description is merely illustrative of a preferred embodiment of the present invention and that the invention is not to be limited thereto, but is to be determined by the scope of the appended claim.

What is claimed is:

1. A vehicle speed control device for use in trolley-assisted dump trucks of a single phase alternating current, characterized in that it comprises in combination:
   (a) an accelerator valve adapted to variably control compressed air from a reservoir in proportion to the amount of depression of an accelerator pedal by the operator;
   (b) an engine throttle control means adapted to receive the air pressure controlled by the accelerator valve to thereby control the engine throttle means;
   (c) an acceleration pattern generator adapted to receive the air pressure controlled by said accelerator valve and convert the air pressure into a voltage;
   (d) a mode converter adapted to receive a voltage signal from the acceleration pattern generator and send out or transmit a voltage pattern to a mixed bridge rectifier installed in a main drive circuit and which comprises thyristors and diodes; and
   (e) an engine control solenoid operated valve adapted to be actuated when a trolley mode change-over switch is turned on and occupy a trolley mode position wherein the compressed air controlled by said accelerator valve is directed or supplied into said acceleration pattern generator, said engine control valve being further adapted to be actuated by the resilient force of a spring associated therewith when the trolley mode change-over switch is turned off and occupy an engine mode position wherein the compressed air is directed or supplied into said engine throttle control means.

* * * * *